Figure 1:
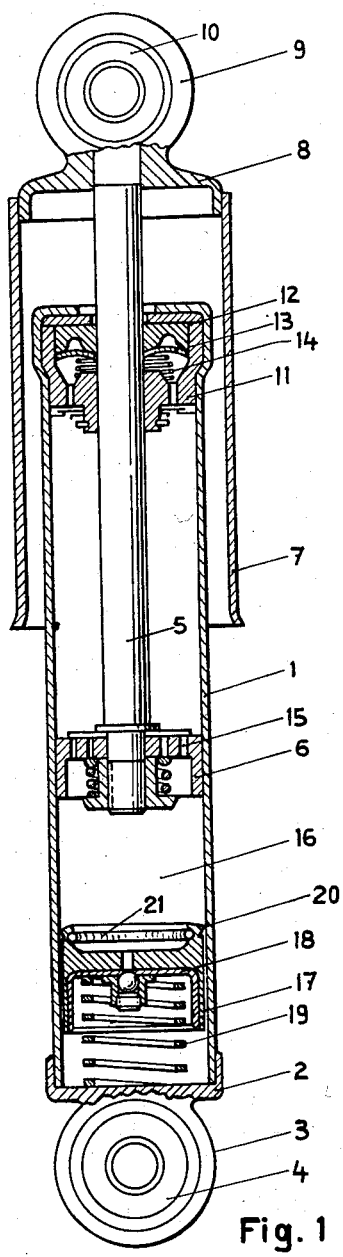

Sept. 20, 1960  A. DILLENBURGER ET AL  2,953,223
HYDRAULIC TELESCOPE-TYPE SHOCK ABSORBER
Filed Aug. 22, 1956

INVENTORS
ALBERT DILLENBURGER
WILLY LEY
BY Richards & Geier
ATTORNEYS

United States Patent Office 2,953,223
Patented Sept. 20, 1960

2,953,223
HYDRAULIC TELESCOPE-TYPE SHOCK ABSORBER

Albert Dillenburger, 28 Andernacherstrasse, Koblenz-Lutzel, Germany, and Willy Ley, 23 Marktstrasse, Nieder-Lahnstein, Germany Filed Aug. 22, 1956, Ser. No. 605,569
Claims priority, application Germany Aug. 22, 1955
3 Claims. (Cl. 188—100)

This invention refers to a hydraulic telescope-type shock absorber and an object of the invention is to improve prior art devices of this type.

Telescope-type shock absorbers are known which comprise an axially movable sealing member which is resiliently supported on at least one side so that it may elastically accommodate pressures originating by the piston movement and balance volumetric changes which arise by the movement of a piston rod without formation of an air cushion.

In telescopic shock absorbers comprising only one working cylinder, the sealing member is disposed on that side of the working cylinder which is remote from the piston rod and is supported by a spring on the side remote from the piston.

The present invention relates to a special construction of such a hydraulic telescope-type shock absorber equipped with only one working cylinder. In such a shock absorber it is known to provide an equalizing chamber between the working piston which is valve-controlled and comprises ports, and the elastically supported sealing member which forms a balancing piston. Said equalizing chamber serves to receive the liquid displaced in the movement of the working cylinder and the change of the volume of the piston rod plunging into the damper liquid. The balanced piston is sealed by a pot-like sleeve made of elastic material and provided with a sealing lip.

Known constructions of such sealing members, however, do not satisfy all the requirements since the sealing lip merely consists of an extension of the cylindrical sleeve portion so that it is pressed against the interior wall of the cylinder only with a force which corresponds to the elasticity of the sealing material. The quality of a sealing thus depends on the elasticity of the sealing material. Hydraulic shock absorbers used in automobiles, however, are exposed to high stresses when driving the vehicle at high speed over uneven tracks, and these stresses vary rapidly in size and frequency, so that the damper liquid is heated to a considerable degree. Thereby the sealing material is softened and loses its elasticity, so that the sealing lip no longer can contact the cylinder wall with sufficient pressure.

Additionally, the sealing lip is subjected to a continuous kneading on account of the rapidly varying loads, so that a positive sealing is no longer assured. It is, however, indispensable for a positive operation of the shock absorber that the balanced piston is positively sealed in order to avoid leakage losses of the damping liquid, which particularly in hydraulic shock absorbers of this construction are of disadvantage on account of the absence of a reserve chamber.

An object of the present invention is to eliminate this difficulty and to permit a positive sealing. According to the invention, the sealing lip of a sleeve made of elastic material projects on the side adjacent the working chamber in the disassembled state radially beyond the sleeve skirt and forms an acute angle with the radial annular sleeve end-face. This bevel of the sealing lip in the disassembled state is in a certain ratio to the diameter of the lip end so that the latter on assembly is pressed under a considerable stress to the interior wall of the damping cylinder and contacts same along an area. Best results are obtained with a bevel angle of 30 to 40°, since under such an angle the sealing lip contacts the damping cylinder upon assembly along an area.

In order to increase the sealing pressure it is recommended to equip the sleeve with an annular spring known per se, which is situated in substantially the same radial plane as the lip end so that the resilience is applied entirely to the lip angle. The latter thereby is exposed to the full pressure of the annular spring and thus contacts the interior wall of the damping cylinder under permanent pressure. Thus a lasting sealing pressure is attained on the sealing lip even when the damper liquid is heated to high degrees, in spite of the ensuing decrease in the elasticity of the sealing member.

The hydraulic shock absorber may be incorporated in a vehicle in any desired position, even horizontally, so that it may be used, for example, as a steering damper for balancing the impacts on the front axle acting on the steering mechanism.

In order to avoid that the annular spring pushes the sleeve portion situated below the lip angle against the cylinder wall owing to the continuous kneading of the sleeve at higher thermal degrees of the damper liquid, which would result in a rapid wear of the sleeve, the supporting face of the annular spring adjacent the sleeve bottom is supported by a reinforcement of the lip throat, so that no deformations of the sleeve can take place. The sleeve thus remains always inherently rigid even at a high temperature of the damping liquid, though it permits of an elastic movement of the sealing lip.

Figure 2:
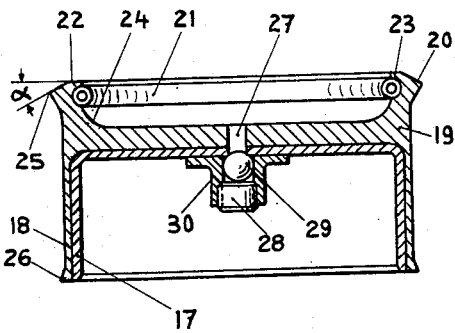

One form of the invention is shown in the accompanying drawings in which:

Fig. 1 shows a longitudinal section of the absorber,
Fig. 2 a similar section through the balancing piston provided with the sealing sleeve, on a larger scale and in the non-assembled state.

As shown in Fig. 1 the telescopic shock absorber comprises a cylindrical housing 1 which through an eye 3 disposed in its bottom 2 and through the intermediary of an elastic bumper 4, for example made of rubber, is connected to the vehicle axle. In housing 1 is guided a piston rod 5 with a working piston 6 movable in cylinder 1 which is filled with a damper liquid. To the exterior end of piston rod 5 is secured a cover 8 carrying a protective tube 7, on which is provided an eye 9 which is attached to the vehicle body through the intermediary of a rubber bumper 10.

Below working piston 6 is provided an equalizing chamber 16 the bottom of which is closed by a sealing sleeve 18 made of elastic, oil-proof material such as rubber or plastic; the sleeve 12 encloses the potlike piston 17 and is rigidly connected thereto, for example, by vulcanisation. Balancing piston 17 with its sealing sleeve 18 is movable in cylinder 1 and is subjected to the influence of a helical pressure spring 19 formed of a flat steel bar, the other end of which abuts against bottom 2 of cylinder 1.

The sealing sleeve 18 enveloping balancing piston 17 is shown in Fig. 2 prior to assembly in the damper cylinder on a larger scale, and on the upper side facing equalizing chamber 16 the sleeve 18 is provided with a lug 19a the upper end of which comprises an outwardly projecting sealing lip 20 and which encloses an annular spring 21. Sealing lip 20 in the non-assembled state projects above the cylindrical central sleeve portion and forms with the annular end face 22 thereof an angle α of approximately 30°. Spring 21 is accommodated in an annular groove 23 on the interior side of lug 19 which is of greater wall thickness in the portion 24 situated below annular face 23 than on its end face. Spring 21 is positioned approximately in the same radial plane as edge 25 of lip 20, so that the lip edge 25 in the assembled state is urged against the interior wall of cylinder 1 by the pressure of spring 21 acting thereon. Further, even at high temperature of the damping liquid and the resulting softening of sleeve 18, there is ensured a sufficient and positive contact of lip 20 on the cylinder wall.

The lower sleeve end remote from equalizing chamber 16 is provided with an annular bead 26 and thus affords a good guidance to the balancing piston in cylinder 1.

The axial length of the pot-like balancing piston 17 substantially corresponds to that of spring 19 fully compressed in the lower terminal position of working piston 6, so that lateral spring forces are completely taken up and cannot bias piston 17.

In the bottom of balancing piston 17 and sleeve 18 there is provided a vent opening 27 which is closed by a ball 29. The latter is pressed onto the rim of said opening in the bottom of piston 17, which rim serves as valve seat, by a screw 28 which is inserted in a threaded boss 30 of the piston bottom so that equalizing chamber 16 in the complete absorber is tightly closed. Through that vent the assembly or disassembly of piston 17 is facilitated, as well as the introduction of damper liquid on assembly of the absorber. This is of considerable practical importance, particularly when the damping cylinder is positively closed by bent-over covers.

The sleeve conveniently is constructed as an envelope of a pot-like balancing piston which accommodates the spring supporting said piston against the cylinder bottom. In order to reduce the friction face of the sleeve on the cylinder wall to a minimum and to afford a uniform guidance of the balancing piston in the working cylinder, the lower sleeve end remote from the working chamber is provided with a bead or a peripheral rib so that the sleeve contacts the cylinder wall only at the upper sealing lip and on the lower bead. Thereby the frictional resistance is held low so that the balancing piston enclosed by the sleeve can accurately balance the pressure variations of the damper liquid. These guiding ribs, especially in the case of large sleeves, also may be provided at any other points of the cylindrical skirt.

A sealing lip also may be provided in similar manner on the lower sleeve end remote from the working chamber in order to prevent the access of atmospheric air into air-filled cylinder spaces defined by the sleeve. This air space additionally may be used for supporting the balancing piston or, especially under a corresponding excess pressure in this air space, take the place of the spring so that the latter is eliminated. The shock absorber thereby is given an additional pneumatic damping besides the hydraulic damping.

We claim:

1. A hydraulic telescope-type shock absorber, comprising a cylinder having a bottom, a piston movable within said cylinder, a movable pot-like balancing piston located within said cylinder between said bottom and the first-mentioned piston, an elastic sealing sleeve enclosing the second-mentioned piston and firmly connected therewith, a spring engaging said bottom and the second-mentioned piston, whereby an equalizing chamber is formed between said sealing sleeve and the first-mentioned piston, said sealing sleeve having opposite the first-mentioned piston an annular lug located adjacent the walls of said cylinder and having a sealing lip, said sealing lip, extending radially above said sealing sleeve when the sealing sleeve is disassembled, said sealing lip having an inclined upper surface, a side surface and a front surface, the upper surface and the side surface forming an angle of substantially ninety degrees, the upper surface and the front surface forming an acute angle of from thirty to forty degrees when the sealing sleeve is disassembled, an annular resilient member embedded in said sleeve, the edge formed by said angle of ninety degrees being located in substantially the same radial plane as said resilient member, said resilient member pressing said edge radially against the inner wall of said cylinder, and wherein said elastic sleeve comprises a bead for guiding said sleeve within said cylinder.

2. A hydraulic telescope-type shock absorber, comprising a cylinder having a bottom, a piston movable within said cylinder, a movable pot-like balancing piston located within said cylinder between said bottom and the first-mentioned piston, an elastic sealing sleeve enclosing the second-mentioned piston and firmly connected therewith, a spring engaging said bottom and the second-mentioned piston, whereby an equalizing chamber is formed between said sealing sleeve and the first-mentioned piston, said sealing sleeve having opposite the first-mentioned piston an annular lug located adjacent the walls of said cylinder and having a sealing lip, said sealing lip, extending radially above said sealing sleeve when the sealing sleeve is disassembled, said sealing lip having an inclined upper surface, a side surface and a front surface, the upper surface and the side surface forming an angle of substantially ninety degrees, the upper surface and the front surface forming an acute angle of from thirty to forty degrees when the sealing sleeve is disassembled, an annular resilient member embedded in said sleeve, the edge formed by said angle of ninety degrees being located in substantially the same radial plane as said resilient member, said resilient member pressing said edge radially against the inner wall of said cylinder, and wherein the second-mentioned pot-like piston has an axial length which is substantially equal to that of said spring when the latter is completely compressed.

3. A hydraulic telescope-type shock absorber, comprising a cylinder having a bottom, a piston movable within said cylinder, a movable pot-like balancing piston located within said cylinder between said bottom and the first-mentioned piston, an elastic sealing sleeve enclosing the second-mentioned piston and firmly connected therewith, a spring engaging said bottom and the second-mentioned piston, whereby an equalizing chamber is formed between said sealing sleeve and the first-mentioned piston, said sealing sleeve having opposite the first-mentioned piston an annular lug located adjacent the walls of said cylinder and having a sealing lip, said sealing lip, extending radially above said sealing sleeve when the sealing sleeve is disassembled, said sealing lip having an inclined upper surface, a side surface and a front surface, the upper surface and the side surface forming an angle of substantially ninety degrees, the upper surface and the front surface forming an acute angle of from thirty to forty degrees when the sealing sleeve is disassembled, an annular resilient member embedded in said sleeve, the edge formed by said angle of ninety degrees being located in substantially the same radial plane as said resilient member, said resilient member pressing said edge radially against the inner wall of said cylinder, and wherein the second-mentioned piston and said sealing sleeve have a central opening formed therein, and means closing said opening during the operation of the shock absorber.

References Cited in the file of this patent

UNITED STATES PATENTS

| | | |
|---|---|---|
| 1,595,610 | Maynard | Aug. 10, 1926 |
| 2,274,304 | Perry | Feb. 24, 1942 |
| 2,599,477 | Patriquin | June 3, 1952 |
| 2,753,957 | Dillenburger et al. | July 10, 1956 |

FOREIGN PATENTS

| | | |
|---|---|---|
| 1,107,155 | France | Aug. 3, 1955 |
| 830,442 | Germany | Feb. 4, 1952 |
| 574,534 | Great Britain | Jan. 9, 1946 |